United States Patent
Fujita et al.

(10) Patent No.: US 9,914,376 B2
(45) Date of Patent: Mar. 13, 2018

(54) SEATBACK FRAME

(71) Applicants: TS TECH CO., LTD., Asaka-shi, Saitama (JP); HONDA MOTOR CO., LTD., Tokyo (JP)

(72) Inventors: Satoshi Fujita, Tochigi (JP); Yusuke Higano, Tochigi (JP); Koji Sano, Saitama (JP); Toshihiko Tsuda, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 57 days.

(21) Appl. No.: 14/916,379

(22) PCT Filed: Sep. 3, 2014

(86) PCT No.: PCT/JP2014/073230
§ 371 (c)(1),
(2) Date: Mar. 3, 2016

(87) PCT Pub. No.: WO2015/033971
PCT Pub. Date: Mar. 12, 2015

(65) Prior Publication Data
US 2016/0229319 A1    Aug. 11, 2016

(30) Foreign Application Priority Data
Sep. 4, 2013    (JP) .................................. 2013-183337

(51) Int. Cl.
*B60N 2/42* (2006.01)
*B60N 2/427* (2006.01)
(Continued)

(52) U.S. Cl.
CPC ......... *B60N 2/4228* (2013.01); *B60N 2/4256* (2013.01); *B60N 2/42745* (2013.01);
(Continued)

(58) Field of Classification Search
CPC .............. B60N 2/42745; B60N 2/4228; B60N 2/4256; B60N 2/68; B60N 2/4207; B60N 2/4221; B60N 2/427
(Continued)

(56) References Cited

U.S. PATENT DOCUMENTS 6,176,543 B1    1/2001 Nawata et al.
8,240,758 B2 *  8/2012 Combest .............. B60N 2/4221
                                                297/216.1
(Continued)

FOREIGN PATENT DOCUMENTS

JP    10-119616 A    5/1998
JP    11-115594 A    4/1999
(Continued)

OTHER PUBLICATIONS

Extended European Search Report issued in related application EP 14842252.0, dated Jul. 28, 2016, 8 pages.
(Continued)

*Primary Examiner* — Chi Q Nguyen
(74) *Attorney, Agent, or Firm* — Drinker Biddle & Reath LLP

(57) ABSTRACT

A frame serving as a seatback frame for a vehicle seat and simply configured to reduce a load applied to a seated occupant at the time of a vehicle collision is provided. A seatback frame includes a connecting wire which connects side frames. The center of the connecting wire is bent to extend toward a front side of a vehicle seat. When the seated occupant is moved toward a rear side of the vehicle seat at the time of a vehicle rear-end collision, the forward extending portion restrains a portion of the back of the seated occupant in which a thoracic vertebra is located and reduces an amount of a rearward movement of the portion.

16 Claims, 12 Drawing Sheets

(51) Int. Cl.
*B60N 2/48* (2006.01)
*B60N 2/68* (2006.01)

(52) U.S. Cl.
CPC ............... *B60N 2/48* (2013.01); *B60N 2/68* (2013.01); *B60N 2/4207* (2013.01); *B60N 2/427* (2013.01); *B60N 2/4221* (2013.01)

(58) Field of Classification Search
USPC .............. 297/216.14, 425.45, 216.1, 216.12, 297/216.13, 452.18, 452.1
See application file for complete search history.

(56) References Cited

U.S. PATENT DOCUMENTS

| | | | |
|---|---|---|---|
| 2002/0135218 A1* | 9/2002 | Fujita | B60N 2/5891 297/452.56 |
| 2010/0270834 A1* | 10/2010 | Niitsuma | B60N 2/4885 297/216.12 |
| 2010/0295348 A1* | 11/2010 | Takayasu | B60N 2/4885 297/216.12 |
| 2011/0241394 A1 | 10/2011 | Yamaguchi et al. | |
| 2012/0001264 A1* | 1/2012 | Kim | C09K 13/04 257/368 |
| 2013/0270878 A1 | 10/2013 | Adachi et al. | |
| 2014/0265494 A1* | 9/2014 | Abe | B60N 2/7094 297/296 |
| 2015/0123435 A1 | 5/2015 | Adachi et al. | |
| 2015/0203013 A1 | 7/2015 | Akutsu et al. | |
| 2015/0251571 A1 | 9/2015 | Adachi et al. | |
| 2016/0229319 A1* | 8/2016 | Fujita | B60N 2/42745 |

FOREIGN PATENT DOCUMENTS

| | | |
|---|---|---|
| JP | 2002-000409 A | 1/2002 |
| JP | 2005-088618 A | 4/2005 |
| JP | 2011-207442 A | 10/2011 |
| WO | 2012/086803 A1 | 6/2012 |
| WO | 2014/024586 A1 | 2/2014 |

OTHER PUBLICATIONS

Office Action issued in related application JP 2013-183337, dated Jun. 6, 2017, with machine generated English language translation, 9 pages.

\* cited by examiner

SEATBACK FRAME

CROSS REFERENCE TO RELATED APPLICATIONS

This application is a National Stage Entry application of PCT Application No. PCT/JP2014/073230, filed Sep. 3, 2014, which claims the priority benefit of Japanese Patent Application No. 2013-183337, filed Sep. 4, 2013, the contents of each of which are incorporated herein by reference in their entireties.

BACKGROUND

Disclosed herein is a seatback frame forming a frame of a seat back for a vehicle seat, and particularly a seatback frame which can reduce an applied load at the time of a vehicle collision.

Countermeasures have been taken in a conventional vehicle seat against a phenomenon in which a seated occupant is moved rearward to sink into the seat at the time of a vehicle rear-end collision (hereinafter, the phenomenon will be referred to as a sinking phenomenon). Among the countermeasures, for example, techniques disclosed in JPH10-119616A and JP2005-088618A have been developed as countermeasures to reduce a load applied to a seated occupant in a sinking phenomenon. The techniques of JPH10-119616A and JP2005-088618A have been both developed in consideration for an amount of sinking (i.e., a rearward movement) of the chest of the seated occupant at the time of the sinking phenomenon.

Briefly, as illustrated in FIG. 9, the amount of sinking of the chest of the seated occupant (shown by the white thick arrow in FIG. 9) at the time of the sinking phenomenon is larger compared to that of another portion such as the neck or the low back. Due to a difference between such amounts of sinking, the seated occupant's posture turns to a so-called slouching posture, and forward loads (shown by the black thick arrows in FIG. 9) each as a reaction force from the seat are applied to the seated occupant. Such forward load is an applied load at the time of a vehicle collision (the applied load will be hereinafter simply referred to as a load). FIG. 9 is a diagram illustrating a general sinking phenomenon, showing a state where the amount of sinking of the chest of the seated occupant is large.

For dealing with the above problem, a vehicle seat disclosed in JPH10-119616A is configured to include: an energy absorbing cassette arranged in a corresponding portion of a seat back to the chest of the seated occupant; and an energy absorbing body arranged in a predetermined position of a headrest. Further, in JPH10-119616A, rebound characteristics (rebound speeds, rebound start timing) of the energy absorbing cassette and the energy absorbing body are adjusted relative to a seatback pad and the headrest while their characteristics are taken into consideration. Therefore, a difference between a rebound speed of the head of the seated occupant and a rebound speed of the chest of the seated occupant when the head and the chest rebound, and a difference between the rebound start timing of the head of the seated occupant and the rebound start timing of the chest of the seated occupant are reduced. According to such configuration, a load acting on the seated occupant at the time of a vehicle collision can be effectively reduced.

Further, in a vehicle seat disclosed in JP2005-088618A, a pivotal frame is provided in a seatback frame. At the time of a vehicle rear-end collision, a lower portion of the pivotal frame pivots in an arc upward and rearward from the front side of the seatback frame while an upper portion of the pivotal frame pivots forward. Meanwhile, when the upper portion of the pivotal frame pivots forward, the headrest moves forward along with such forward pivotal movement of the upper portion. Furthermore, in JP2005-088618A, when the chest of the seated occupant is sunk into the seat back by impact inertia at the time of the vehicle rear-end collision, the lower portion of the pivotal frame pivots in an arc by using the sinking movement. In conjunction with such pivotal movement of the lower portion, the headrest moves correspondingly to a movement of the head of the seated occupant at the time of the vehicle rear-end collision. According to such configuration, at the time of the sinking phenomenon, a difference between the amount of sinking of the chest of the seated occupant and an amount of sinking of the head of the seated occupant can be reduced. As a result, a load acting on the seated occupant at the time of the vehicle collision can be effectively reduced.

However, in JPH10-119616A and JP2005-088618A, the energy absorbing cassette and the energy absorbing body or the pivotal frame and its accessory components are required in order to reduce the load to the seated occupant at the time of the sinking phenomenon. Therefore, the configuration of the seat may be complicated, and the number of components may increase. Consequently, the configuration is required to be simplified as a countermeasure to reduce the load at the time of the vehicle collision.

Accordingly, the seatback frame disclosed herein is made in view of the above problem, and provides a frame which serves as a seatback frame forming a frame of a seat back for a vehicle seat and which is simply configured to reduce a load applied to a seated occupant at the time of a vehicle collision.

SUMMARY

According to an embodiment, there is a seatback frame forming a frame of a seat back which supports a back of a seated occupant on a vehicle seat, the seatback frame including a movement reduction member for when the seated occupant is moved to a rear side of the vehicle seat by a vehicle collision, restraining a portion of the back of the seated occupant in which a thoracic vertebra is located and reducing a rearward movement of the portion.

The aforementioned configuration restrains the chest of the seated occupant at the time of the vehicle collision to reduce an amount of sinking (the rearward movement) of the chest, thereby reducing a load applied to the seated occupant. In other words, the seatback frame configured as described above is provided with a member for restraining the chest of the seated occupant at the time of the vehicle collision, thereby being relatively simply configured to reduce the load applied to the seated occupant.

Further, in the aforementioned seatback frame, the movement reduction member may be a wire-shaped member including a forward extending portion which extends to a front side of the vehicle seat.

According to the aforementioned configuration, the movement reduction member is configured by the wire-shaped member such as a wire; therefore, the load applied to the seated occupant can be reduced by a further simple configuration.

Furthermore, in the aforementioned seatback frame, the wire-shaped member is a connecting wire connecting both ends of the seat back in a width direction thereof, and a predetermined portion of the connecting wire may be bent toward the front side of the vehicle seat to form the forward extending portion.

According to the aforementioned configuration, the connecting wire connecting both ends of the seatback frame in the width direction is applied as the movement reduction member. Therefore, it is not necessary to separately prepare a wire-shaped member serving as the movement reduction member. Consequently, the number of components and the size of the seatback frame are inhibited from increasing.

Moreover, in the aforementioned seatback frame, the forward extending portion includes a plurality of forward extending portions formed in the center of the connecting wire in the width direction, and each of the plurality of forward extending portions may include a first extending portion extending toward the front side of the vehicle seat and a second extending portion continuously formed with a front end of the first extending portion to extend in the width direction.

According to the aforementioned configuration, rigidity of the forward extending portion of the connecting wire that configures the movement reduction member is ensured. Therefore, the chest of the seated occupant can be appropriately restrained at the time of the vehicle collision. In addition, the plural forward extending portions are formed in the center of the connecting wire in the width direction; thereby, the amount of sinking of the chest of the seated occupant can be further effectively reduced.

Further, in the aforementioned seatback frame, the connecting wire is positioned below a headrest pillar in the vehicle seat, the headrest pillar being provided to attach a headrest to the seat back, and the second extending portion may be positioned to overlap a position in which the headrest pillar is arranged in the width direction.

According to the aforementioned configuration, there is a space below the headrest pillar in the seatback frame, and such space is utilized to provide the forward extending portions of the connecting wire; thereby, the seatback frame can be compactly configured.

Furthermore, in the aforementioned seatback frame, a pair of lateral frames is arranged in both ends of the seat back in the width direction, and the second extending portion may be positioned in a rear side of front ends of the lateral frames and in a front side of rear ends of the lateral frames.

According to the aforementioned configuration, the connecting wire serving as the movement reduction member does not press the seated occupant at normal times while pressing the seated occupant at the time of the vehicle collision. That is, according to the aforementioned configuration, the movement reduction member presses the seated occupant only at the time of the vehicle collision, but at other times the movement reduction member does not interfere with the seated occupant. Therefore, a seating feeling at the vehicle seat can be secured.

Moreover, the aforementioned seatback frame may further include a low-back movement restriction member for when the seated occupant is moved toward the rear side of the vehicle seat by the vehicle collision, restraining a low back of the seated occupant to inhibit a rearward movement of the low back.

According to the aforementioned configuration, the load applied to the seated occupant at the time of the vehicle collision can be further effectively reduced. Briefly, the rearward movement of the low back of the seated occupant is restricted by the low-back movement restriction member at the time of the vehicle collision, and in the meantime, the seated occupant's torso and head pivot rearward about the low back. At this time, the chest of the seated occupant is restrained by the movement reduction member to be restricted from moving rearward. Therefore, the head of the seated occupant moves rearward. Consequently, the head of the seated occupant can be effectively supported by the headrest and an advantageous effect to reduce the load applied to the seated occupant can be remarkably exerted.

Further, the aforementioned seatback frame includes a pressure receiving member arranged in an inclined state with respect to an up to down direction to support the upper body of the seated occupant so that the upper body can move rearward, and when seen from the end of the seat back in the width direction, the movement reduction member may be provided in a rear side of an area where the pressure receiving member is positioned in a front to back direction.

In the aforementioned configuration, the pressure receiving member supports the upper body of the seated occupant, and the movement reduction member is arranged in the rear side of the pressure receiving member. With such configuration, when an occupant sits on the seat, the seated occupant is first supported by the pressure receiving member and is thereafter pressed by the movement reduction member. Such configuration enables the movement reduction member to be further stably supported.

Furthermore, the aforementioned seatback frame includes an upper frame forming an upper end of the seatback frame to include a portion extending in a height direction of the seat back, and when seen from the end of the seat back in the width direction, the second extending portion may be provided in a rear side of an imaginary plane which passes through the center in a front to back direction of the portion of the upper frame extending in the height direction.

In the aforementioned configuration, the second extending portion of the wire-shaped member that configures the movement reduction member is arranged in the rear side of the upper frame of the seatback frame. With such configuration, when an occupant sits on the seat, the seated occupant is supported by the upper frame of the seatback frame and is thereafter pressed by the second extending portion. Such configuration enables the movement reduction member to be further stably supported.

Moreover, the aforementioned seatback frame includes an upper frame forming an upper end of the seatback frame to include a portion extending in a height direction of the seat back. The portion of the upper frame extending in the height direction is positioned in each of the both ends of the seat back in the width direction, and the movement reduction member is arranged in an inner side in the width direction from the portion of the upper frame extending in the height direction and is attached to the portion.

In the aforementioned configuration, the movement reduction member is arranged in the inner side of the upper frame of the seatback frame in the width direction of the seat to be attached to the upper frame. That is, the movement reduction member is arranged in the inner side of the seatback frame in the width direction; therefore, the movement reduction member can be further compactly arranged.

Further, in the aforementioned seatback frame, the connecting wire is positioned below the headrest pillar in the vehicle seat, the headrest pillar being provided to attach the headrest to the seat back, and a position in the connecting wire in which the forward extending portion is formed may be below the headrest pillar.

According to the aforementioned configuration, the forward extending portion is arranged below the headrest pillar. Therefore, vibrations generated by a contact between the connecting wire and the headrest pillar can be inhibited.

Furthermore, in the aforementioned seatback frame, the position in the connecting wire in which the forward extending portion is formed may be ahead of the headrest pillar.

According to the aforementioned configuration, the forward extending portion is arranged ahead of the headrest pillar. Therefore, when the forward extending portion presses a thoracic vertebra equivalent portion of the back of the seated occupant, an influence of the headrest pillar is inhibited and the rearward movement of the thoracic vertebra equivalent portion can be effectively restricted.

Moreover, the aforementioned seatback frame includes an upper frame forming an upper end of the seatback frame to include a portion extending in a height direction of the seat back, and each of both ends of the connecting wire in the width direction is attached to the portion of the upper frame extending in the height direction. In addition, a position in the connecting wire in which the forward extending portion is formed may be ahead of an attachment position of the end of the connecting wire to the portion of the upper frame extending in the height direction.

According to the aforementioned configuration, the forward extending portion is arranged ahead of the attachment position of the end of the connecting wire to the portion of the upper frame extending in the height direction. Therefore, when the forward extending portion presses the thoracic vertebra equivalent portion of the back of the seated occupant, the attached state of the connecting wire to the upper frame is inhibited from being affected and the rearward movement of the thoracic vertebra equivalent portion can be effectively restricted.

In addition, in the aforementioned seatback frame, a pair of lateral frames is arranged in both ends of the seat back in the width direction, and a position in the connecting wire in which a front end of the forward extending portion is provided may be ahead of rear ends of the lateral frames.

According to the aforementioned configuration, the front end of the forward extending portion is arranged ahead of the rear ends of the lateral frames. Therefore, when the forward extending portion presses the thoracic vertebra equivalent portion of the back of the seated occupant via the front end, an influence of the lateral frames is inhibited and the rearward movement of the thoracic vertebra equivalent portion can be effectively restricted.

According to an embodiment, a load applied to a seated occupant can be reduced by a relatively simple configuration in which the member (movement reduction member) which restrains the chest of the seated occupant at the time of a vehicle collision is provided.

Further, according to an embodiment, the movement reduction member is configured by the wire-shaped member such as a wire; therefore, the load applied to the seated occupant can be reduced by a further simple configuration.

Furthermore, according to an embodiment, the connecting wire connecting the pair of lateral frames therebetween is applied as the movement reduction member. Therefore, increases of the number of components and the size of the seatback frame due to the adoption of the movement reduction member can be inhibited.

Moreover, according to an embodiment, the rigidity of the forward extending portion of the connecting wire that configures the movement reduction member is ensured, and the plural forward extending portions are formed in the center of the connecting wire in the width direction; thereby, at the time of the vehicle collision, the amount of sinking of the chest of the seated occupant can be effectively reduced.

In addition, according to an embodiment, the space provided below the headrest pillar is effectively utilized to provide the forward extending portions of the connecting wire; thereby, the seatback frame can be compactly configured.

Further, according to an embodiment, the movement reduction member presses the seated occupant only at the time of the vehicle collision, but at other times the movement reduction member does not interfere with the seated occupant. Therefore, a seating feeling at the vehicle seat can be secured.

Furthermore, according to an embodiment, at the time of the vehicle collision, the head of the seated occupant can be effectively supported by the headrest and the load applied to the seated occupant can be significantly reduced.

Moreover, according to an embodiment, when an occupant sits on the seat, the seated occupant is first supported by the pressure receiving member and is thereafter pressed by the movement reduction member. Therefore, the movement reduction member can be further stably supported.

In addition, according to an embodiment, when an occupant sits on the seat, the seated occupant is supported by the upper frame of the seatback frame and is thereafter pressed by the second extending portion. Therefore, the movement reduction member can be further stably supported.

Further, according to an embodiment, the movement reduction member is arranged in the inner side of the seatback frame in the width direction; therefore, the movement reduction member can be further compactly arranged.

Furthermore, according to an embodiment, the forward extending portion is arranged below the headrest pillar. Therefore, vibrations generated by a contact between the connecting wire and the headrest pillar can be inhibited.

Moreover, according to an embodiment, the forward extending portion is arranged ahead of the headrest pillar. Therefore, when the forward extending portion presses the thoracic vertebra equivalent portion of the back of the seated occupant, the influence of the headrest pillar is inhibited and the rearward movement of the thoracic vertebra equivalent portion can be effectively restricted.

Further, according to an embodiment, the forward extending portion is arranged ahead of the attachment position of the end of the connecting wire to the upper frame. Therefore, when the forward extending portion presses the thoracic vertebra equivalent portion of the back of the seated occupant, the attached state of the connecting wire to the upper frame is inhibited from being affected and the rearward movement of the thoracic vertebra equivalent portion can be effectively restricted.

Furthermore, according to an embodiment, the front end of the forward extending portion is arranged ahead of the rear ends of the lateral frames. Therefore, when the forward extending portion presses the thoracic vertebra equivalent portion of the back of the seated occupant via the front end, the influence of the lateral frames is inhibited and the rearward movement of the thoracic vertebra equivalent portion can be effectively restricted.

DESCRIPTION OF EMBODIMENTS

An embodiment of the invention will be hereinafter described with reference to the drawings.

In the following description, a front to back direction means a front to back direction when seen from a seated occupant seated on a vehicle seat, and a width direction means a width direction (transversal direction) of a seat back of the vehicle seat. A height direction means a height direction, specifically, an up to down direction of the seat back when the seat back is seen from the front. Furthermore, a shape and an arrangement position of each member described below correspond to the shape and the arrangement position obtained when the vehicle seat is in a seated position, unless otherwise specified.

In addition, the embodiment described below is only an example for facilitating understanding and is not intended for purposes of limitation. That is, it will be understood that the invention may be changed and modified without departing from the spirit of the invention and that the invention may include its equivalents.

Figure 1:
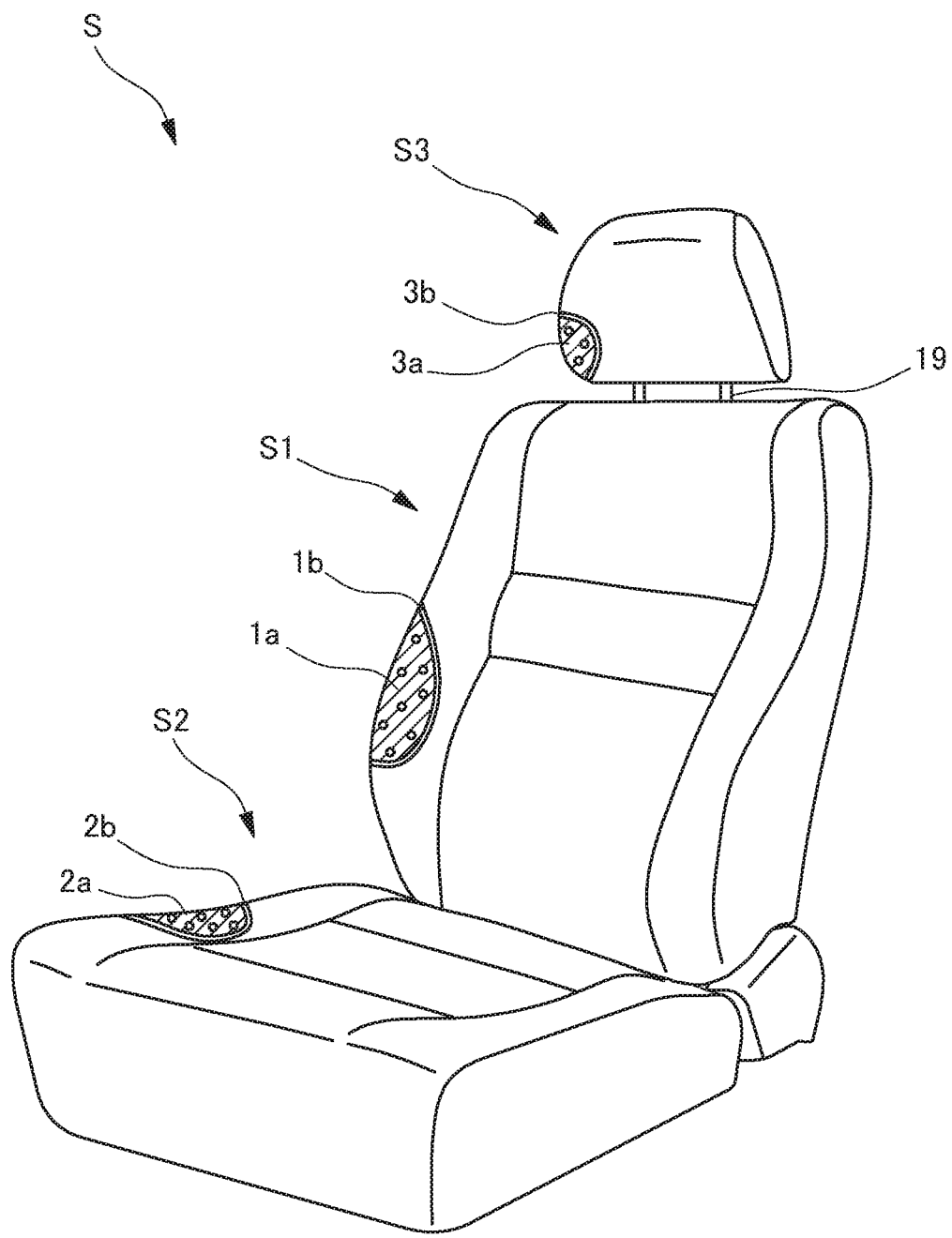
FIG. 1 is an outline view of a vehicle seat.
Figure 2:
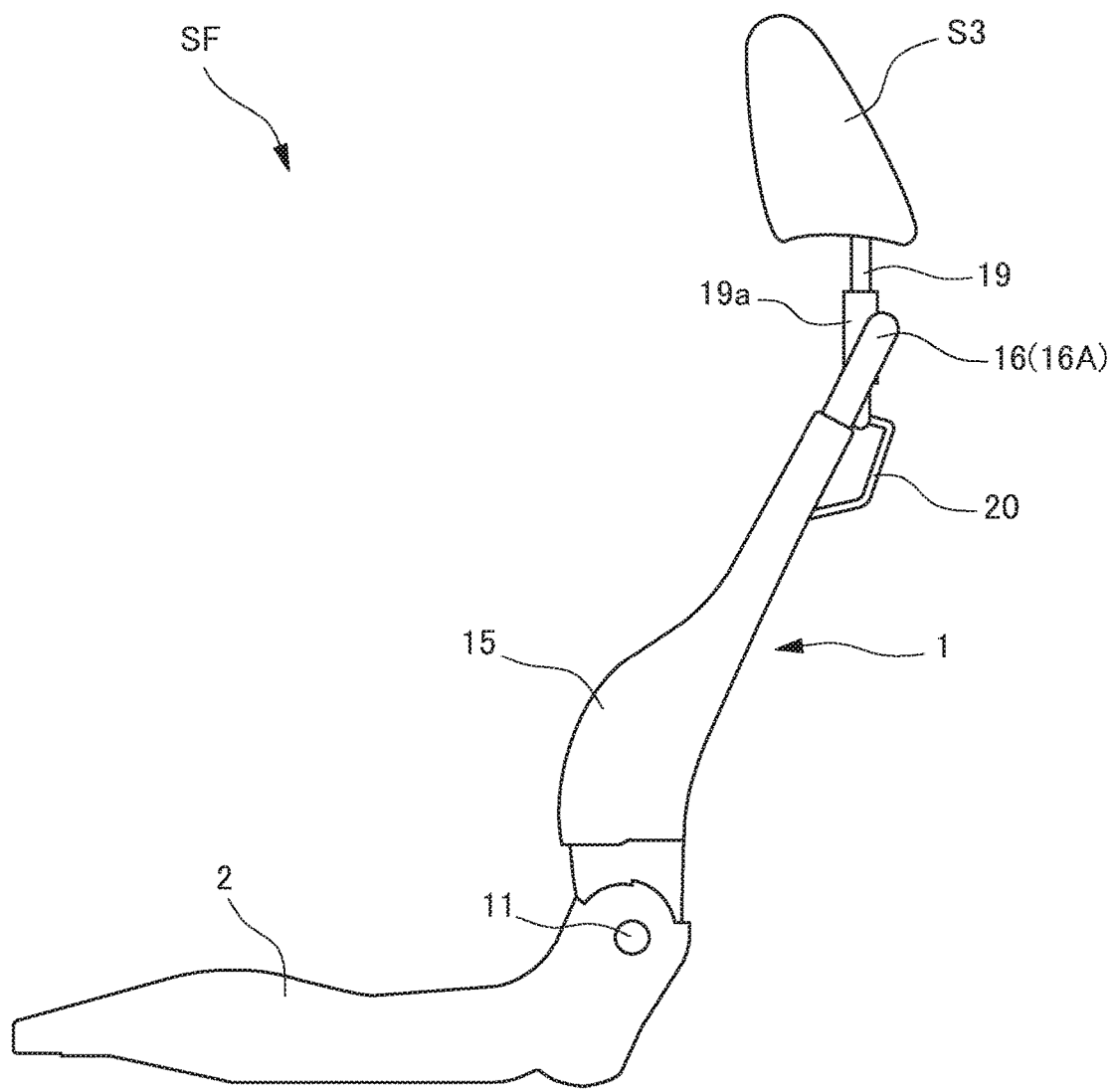
FIG. 2 is a side view of a seat frame.

First, with reference to FIGS. 1 and 2, the entire configuration of a vehicle seat S including a seatback frame will be described. FIGS. 1 and 2 illustrate exemplar configurations of the vehicle seat S and a seat frame SF. FIG. 1 is an outline view of the vehicle seat S, and FIG. 2 is a side view of the seat frame SF.

As shown in FIG. 1, the vehicle seat S includes a seat back S1 which supports the back of the seated occupant, a seat cushion S2 which supports the buttocks of the seated occupant, and a headrest S3 which supports the head of the seated occupant. A pad member 1a, 2a, 3a mounted on a frame work as a frame of each of the seat back, the seat cushion, and the headrest is covered by a surface material 1b, 2b, 3b.

Here, as shown in FIG. 2, a lower end of a seatback frame 1 forming the frame of the seat back S1 of the seat frame SF is connected to a rear end of a seat cushion frame 2 forming the frame of the seat cushion S2. Further, a reclining device (not shown) is provided between the seatback frame 1 and the seat cushion frame 2; thereby, the seatback frame 1 can pivot relative to the seat cushion frame 2 about a reclining shaft 11 and a rearward tilt angle (backrest angle) of the seat back S1 relative to the seat cushion S2 is adjustable. Furthermore, the reclining shaft 11 is slightly protruded outward in the width direction while penetrating the lower end on the lateral side of the seatback frame 1 and the rear end on the lateral side of the seat cushion frame 2.

Moreover, tubular pillar supporting portions 19a are attached to an upper end in the center of the seatback frame 1. In addition, headrest pillars 19 extending from a lower end of the headrest S3 are inserted in the pillar supporting portions 19a; thereby, the headrest S3 is attached to the seat back S1.

Figure 3:
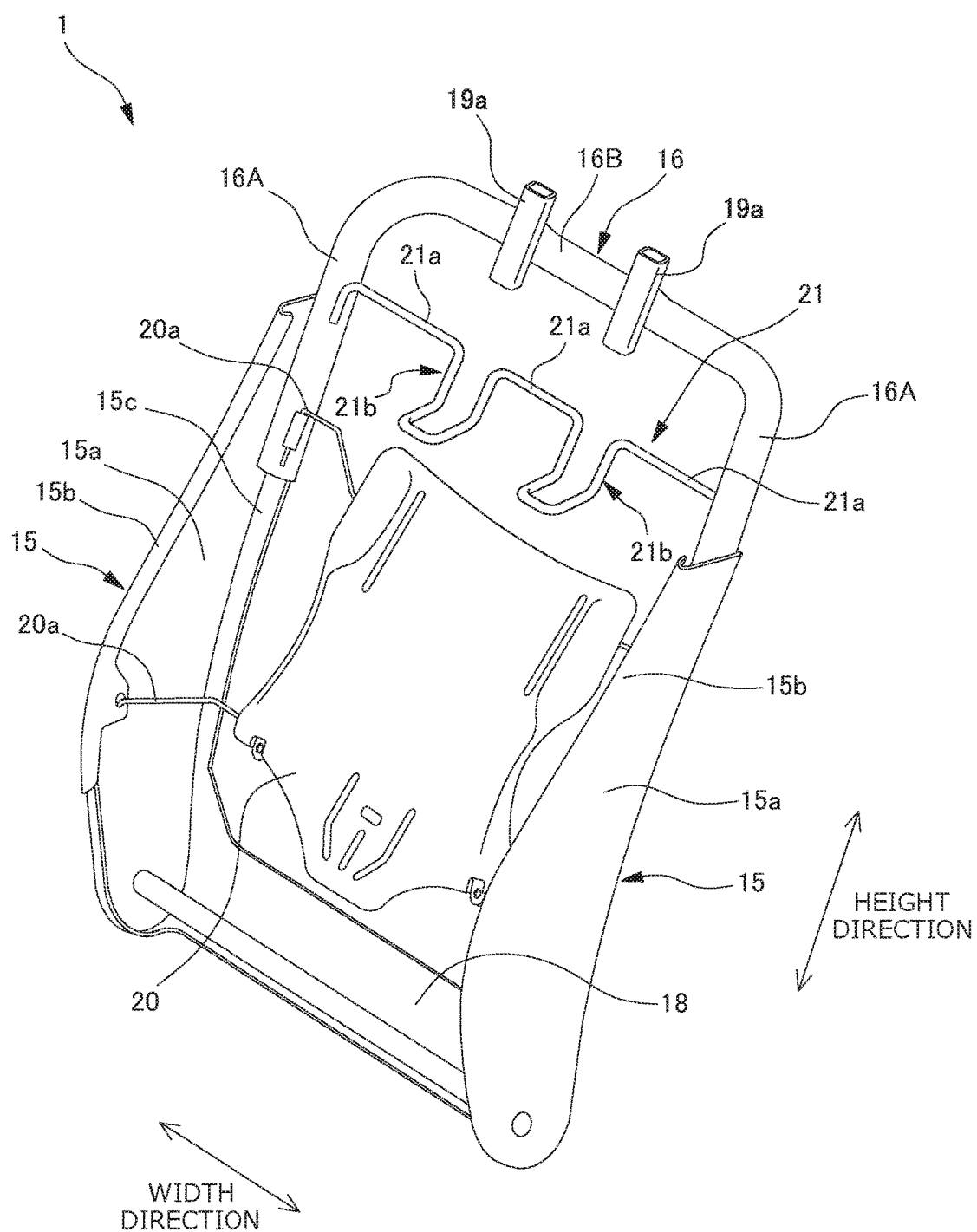
FIG. 3 is a perspective view of a seatback frame according to an embodiment.

Next, an exemplar configuration of the seatback frame 1 will be described with reference to FIGS. 2 and 3. FIG. 3 is a perspective view of the seatback frame 1 according to an embodiment, and in the same figure, the width direction and the height direction are indicated by the arrows.

As shown in FIG. 3, the seatback frame 1 is a substantially rectangular shaped frame body configured by a generally metallic member. The seatback frame 1 includes as main components, a pair of side frames 15 provided in the both ends in the width direction, an upper frame 16 provided in the upper end in the height direction, and a lower frame bridging portion 18 provided in the lower end. In addition, in the present embodiment, the side frames 15, the upper frame 16, and the lower frame bridging portion 18 separated from one another are assembled with one another to be integrated, thereby configuring the seatback frame 1; however, they may be initially integrally formed, i.e., as a single-piece member formed by integral molding with resin.

The pair of side frames 15 corresponds to a pair of lateral frames which are separated from each other in the right to left direction to define the width of the seat back S1 and which are both arranged to extend in the up to down direction. As shown in FIG. 3, each of the side frames 15 includes a side plate 15a, a front rim portion 15b which is formed by bending a front end of the side plate 15a into a circular arc shape, and a rear rim portion 15c which is formed by bending a rear end of the side plate 15a into an L shape. Further, in a condition where the vehicle seat S is provided in a seated position as shown in FIG. 2, the upper end of each side frame 15 is positioned slightly rearward than the lower end. Furthermore, the lower end of each side frame is formed to be wider than the upper end in the front to back direction.

The upper frame 16 serving to connect the upper ends of the pair of side frames 15 is formed in a reversed U-shape as seen from the front. A steel pipe is folded and bent to thereby form the upper frame 16 according to an embodiment. Both ends of the upper frame 16 are attached to the upper ends of the side frames 15, respectively. In addition, the foregoing two pillar supporting portions 19a are attached to the center of the upper frame 16 to be arranged in intervals from each other.

As described above, the upper frame 16 is configured by upward extending portions 16A which extend from the side frames 15 and which are arranged to be separated in the right to left direction and by a pillar attachment portion 16B which is provided bent and extending to be bridged between upper ends of a right and left pair of upward extending portions 16A. Here, the upward extending portions 16A correspond to portions which are provided in the both ends of the upper frame 16 in the width direction to extend in the height direction.

In addition, the upper frame 16 is arranged so that the upward extending portions 16A are overlapped with the upper ends of the side frames 15, and the upper frame 16 is welded by these overlapped portions to the side frames 15.

Further, as shown in FIG. 3, a connecting wire 21 as a wire-shaped member is bridged between the upward extending portions 16A of the upper frame 16. This connecting wire 21 is attached to comply with safety requirements. Specifically, the connecting wire 21 is provided so that corner portions (lower ends) of the headrest pillars 19 inserted in the pillar supporting portions 19a do not make contact with the seated occupant, and the connecting wire 21 is positioned slightly below the lower ends of the headrest pillars 19.

Furthermore, in order to ensure rigidity, the connecting wire 21 having a relatively large wire diameter is bent at several times at its midway positions. Specifically, the connecting wire 21 includes portions 21a which extend in the width direction of the seat back S1 (the portions will be hereinafter referred to as horizontal portions) and portions 21b which are bent perpendicularly relative to the horizontal portions 21a and folded into substantially U-shapes (the portions will be hereinafter referred to as U-shaped portions).

Moreover, an end of the connecting wire 21 is welded to the upward extending portion 16A of the upper frame 16; however, in view of ensuring rigidity of a portion of the connecting wire 21 to be welded and securing an area of the portion, the end of the connecting wire 21 is bent at a right angle and a section from the bent portion to the end of the connecting wire 21 is welded to the upward extending portion 16A. In addition, as shown in FIG. 3, the portion of the connecting wire 21 to be welded to the upper frame 16 is located to overlap the overlapped portion of the upward extending portion 16A of the upper frame 16 with the side frame 15. Thus, the connecting wire 21 is welded to the overlapped portion of the upward extending portion 16A with the side frame 15. As a result, the attaching rigidity of the connecting wire 21 is relatively high.

The lower frame bridging portion 18 is a portion which is bridged between the lower ends of the side frames 15 to connect the pair of side frames 15.

Figure 10:
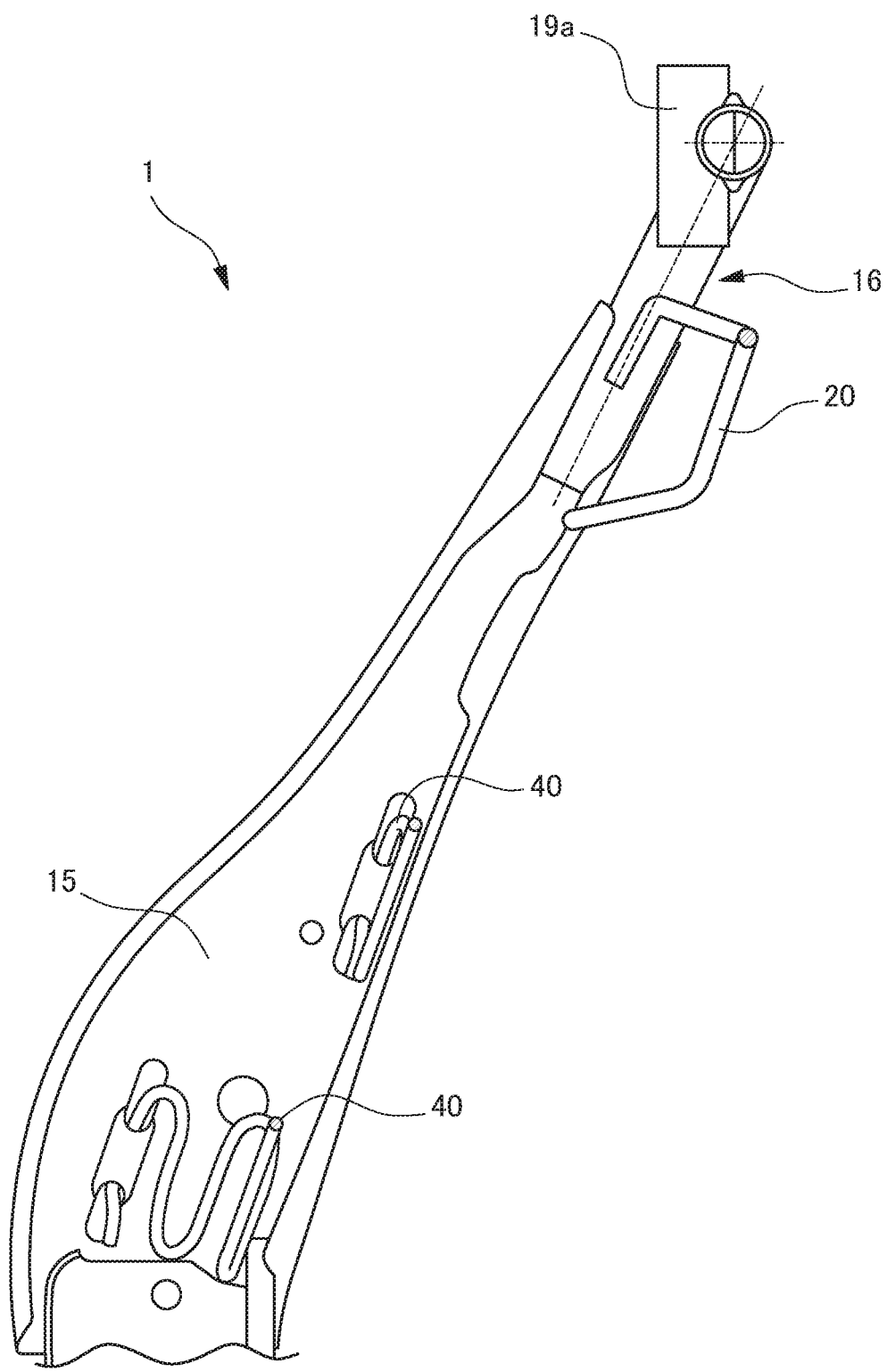
FIG. 10 is a side view of the seatback frame equipped with a different kind of pressure receiving member.
Figure 11:
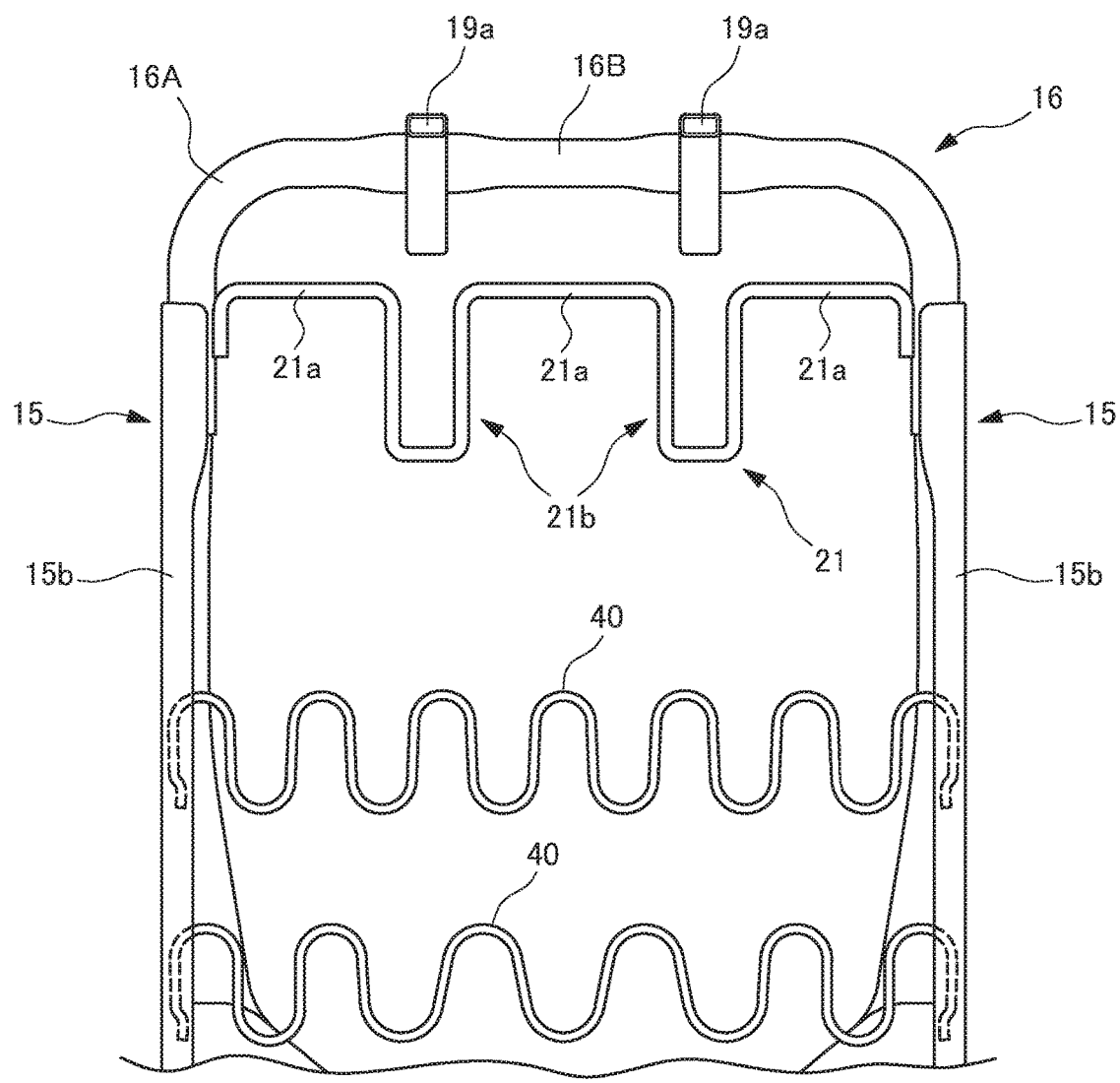
FIG. 11 is a back view of the seatback frame equipped with the different kind of pressure receiving member.

Furthermore, in addition to the configuration described above, the seatback frame 1 according to an embodiment includes a pressure receiving member 20 shown in FIG. 3. This pressure receiving member 20 serves to support the upper body of the seated occupant so that the upper body is can move rearward. Specifically, the pressure receiving member 20 is a substantially rectangular plate made of resin to support the pad member 1a of the seat back S1 from behind. Further, in an embodiment, the pressure receiving member 20 formed by the resin plate is described as an example; however, a pressure receiving member 40 formed by a spring member (so-called S spring) curved in a wave shape as shown in FIG. 10 or FIG. 11 may be applied. FIG. 10 and FIG. 11 illustrate the seatback frame 1 provided with the pressure receiving member 40 which is a different kind of pressure receiving member. FIG. 10 is a side view of such seatback frame 1. FIG. 11 is a back view of the same seatback frame 1.

Moreover, the pressure receiving member 20 is arranged in a space surrounded by the pair of side frames 15, the upper frame 16, and the lower frame bridging portion 18. Specifically, the pressure receiving member 20 is supported by each of the pair of side frames 15 to be hung thereby. More specifically, central portions of fixation wires 20a are hooked to upper and lower portions at one side (back surface) of the pressure receiving member 20, which is located opposite to the other side facing the pad member 1a, and ends of the wires 20a are fixed to predetermined portions of each of the side frames 15. Therefore, the pressure receiving member 20 is arranged within the seatback frame 1 while being hung by the fixation wires 20a spanned between the pair of side frames 15.

In addition, in an embodiment, the pressure receiving member 20 is arranged within the seatback frame 1 while being inclined with respect to the up to down direction so that the upper end is located slightly further rearward than the lower end is located.

Meanwhile, when a phenomenon in which the seated occupant on the vehicle seat S is moved rearward by a vehicle rear-end collision to be sunk into the seat occurs, i.e., when a sinking phenomenon occurs, an amount of sinking of the chest of the seated occupant is larger in the general vehicle seat S compared to that of another portion such as the neck or the lower back. As a result, a load applied to the seated occupant relatively increases and a degree of forward tilt of the head of the seated occupant due to the load may increase.

For dealing with such a situation, the seatback frame 1 of the vehicle seat S may be configured so that the load applied to the seated occupant at the time of a vehicle rear-end collision can be reduced.

Figure 4:
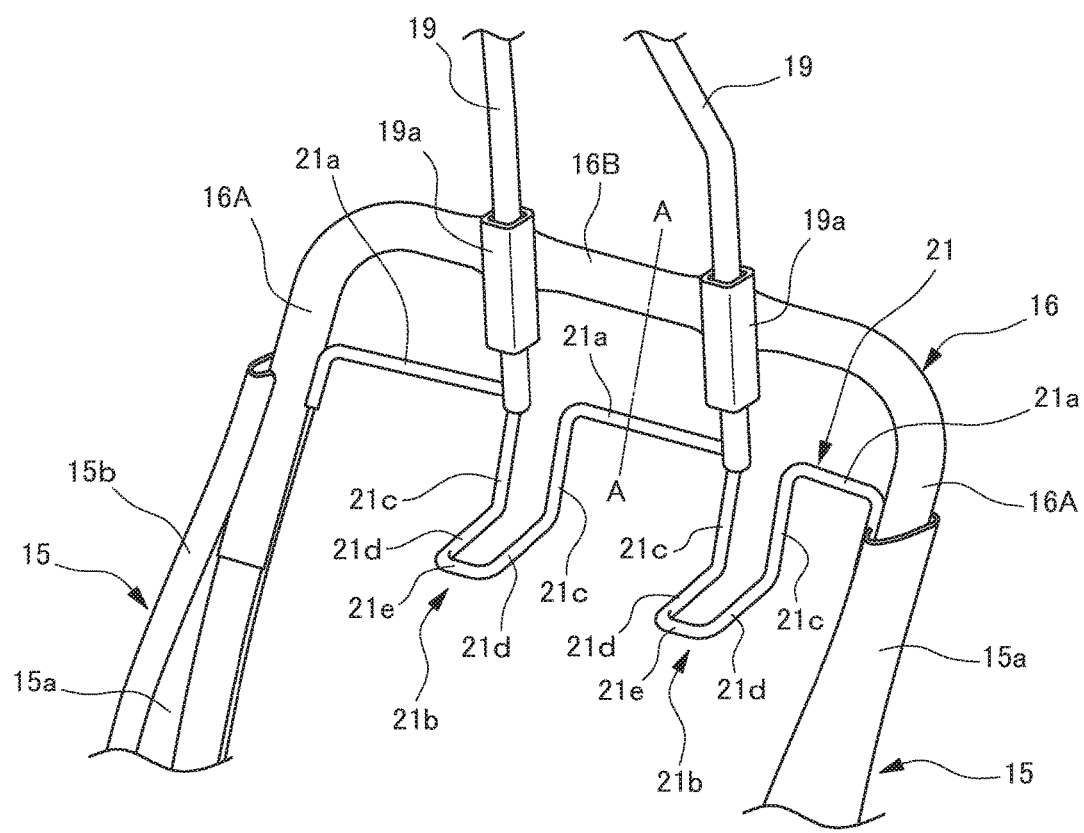
FIG. 4 is an enlarged view of a connecting wire and a surrounding area thereof.
Figure 5:
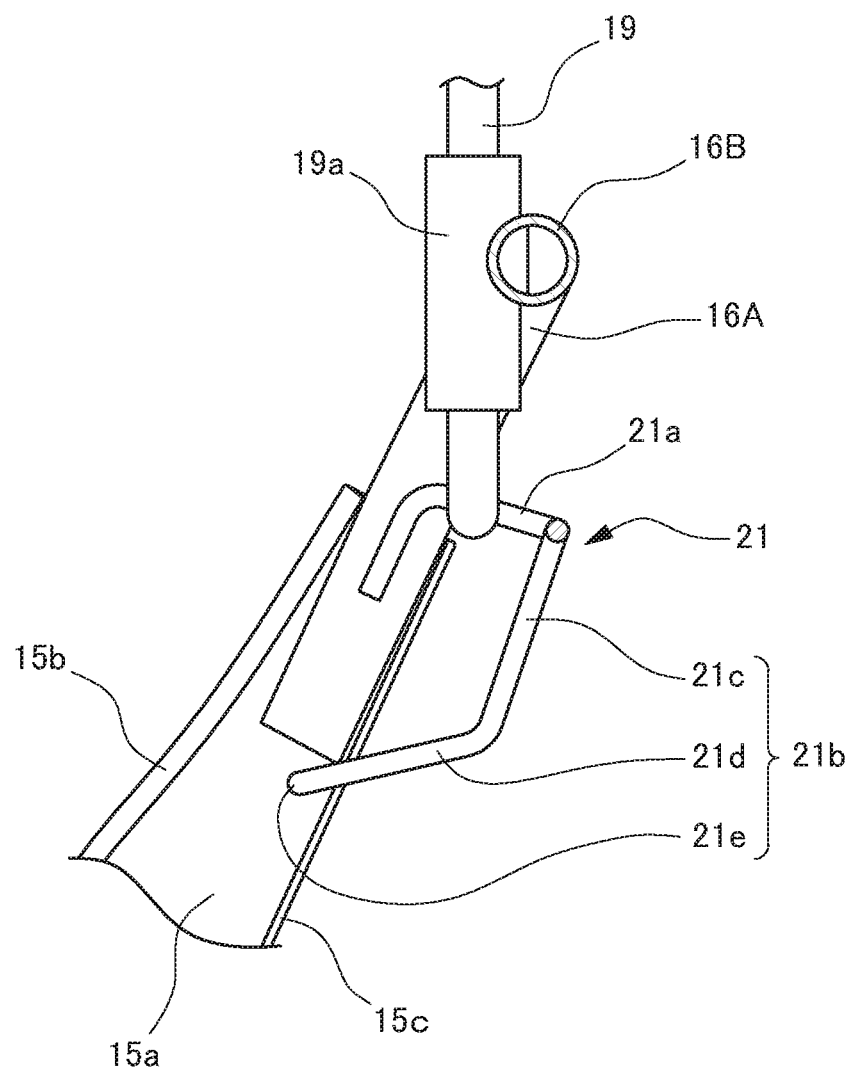
FIG. 5 is a cross-sectional view taken along the line A-A of FIG. 4.
Figure 6:
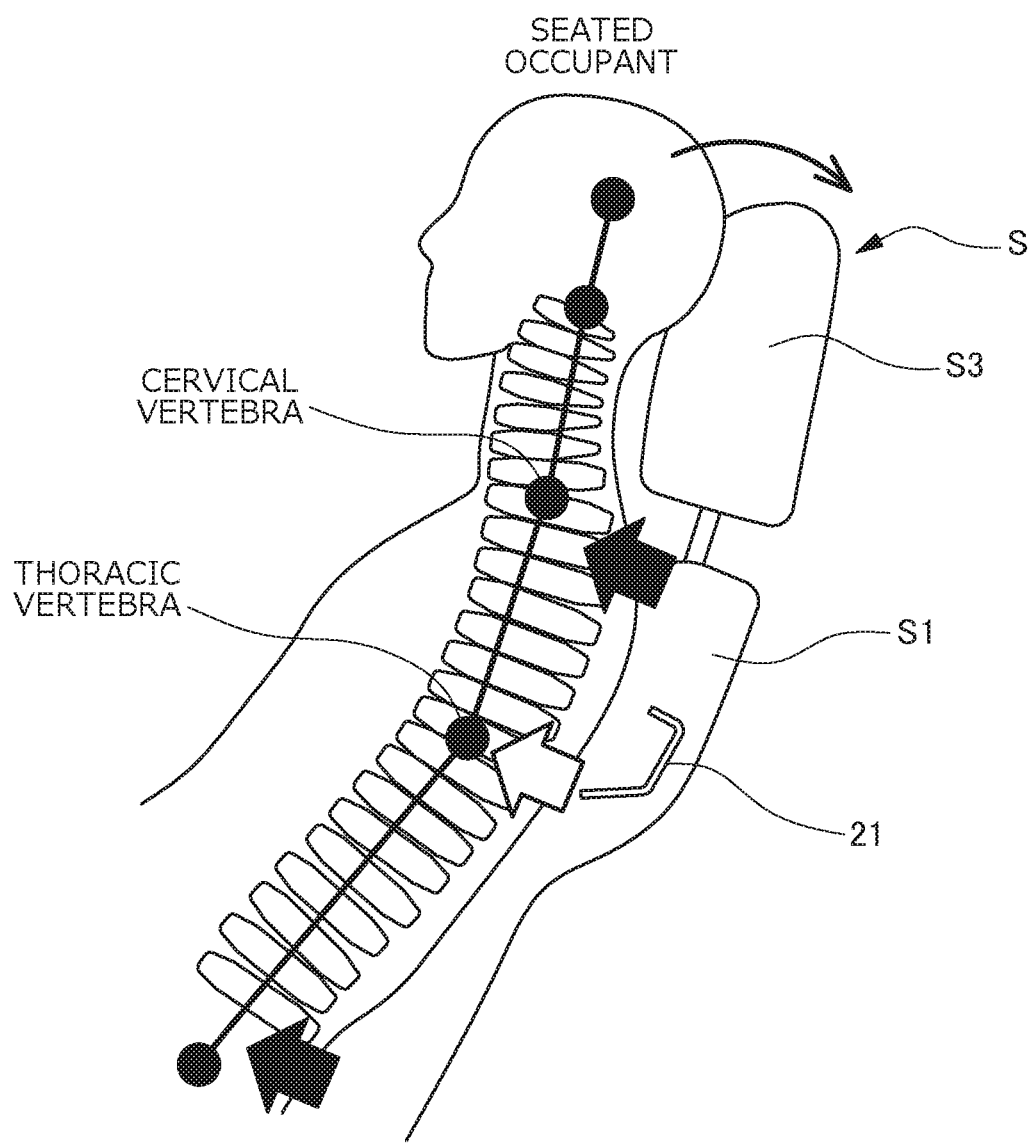
FIG. 6 is a drawing illustrating an advantageous effect.

The configuration applied to the seatback frame 1 in order to reduce the load applied to the seated occupant at the time of a vehicle rear-end collision will be hereinafter described in detail with reference to FIGS. 4 to 6. FIGS. 4 and 5 illustrate the configuration to reduce the load applied to the seated occupant at the time of the vehicle rear-end collision. FIG. 4 is an enlarged view of the connecting wire 21 and a surrounding area thereof. FIG. 5 is a cross-sectional view taken along the line A-A of FIG. 4. Further, FIG. 6 is a drawing illustrating advantages of an embodiment, and illustrates a state of the seated occupant at the time of the vehicle rear-end collision of the vehicle seat S according to an embodiment and corresponds to FIG. 9.

The seatback frame 1 is provided with a movement reduction member for when the seated occupant is moved toward the rear side of the vehicle seat S by the vehicle collision, restraining a portion of the back of the seated occupant in which a thoracic vertebra is located (hereinafter the portion will be referred to as a thoracic vertebra equivalent portion) and reducing an amount of sinking of the portion. Thus, at the time of the vehicle rear-end collision, the chest of the seated occupant is restrained to reduce the amount of sinking of the portion; thereby, the load applied to the seated occupant can be reduced.

Figure 9:
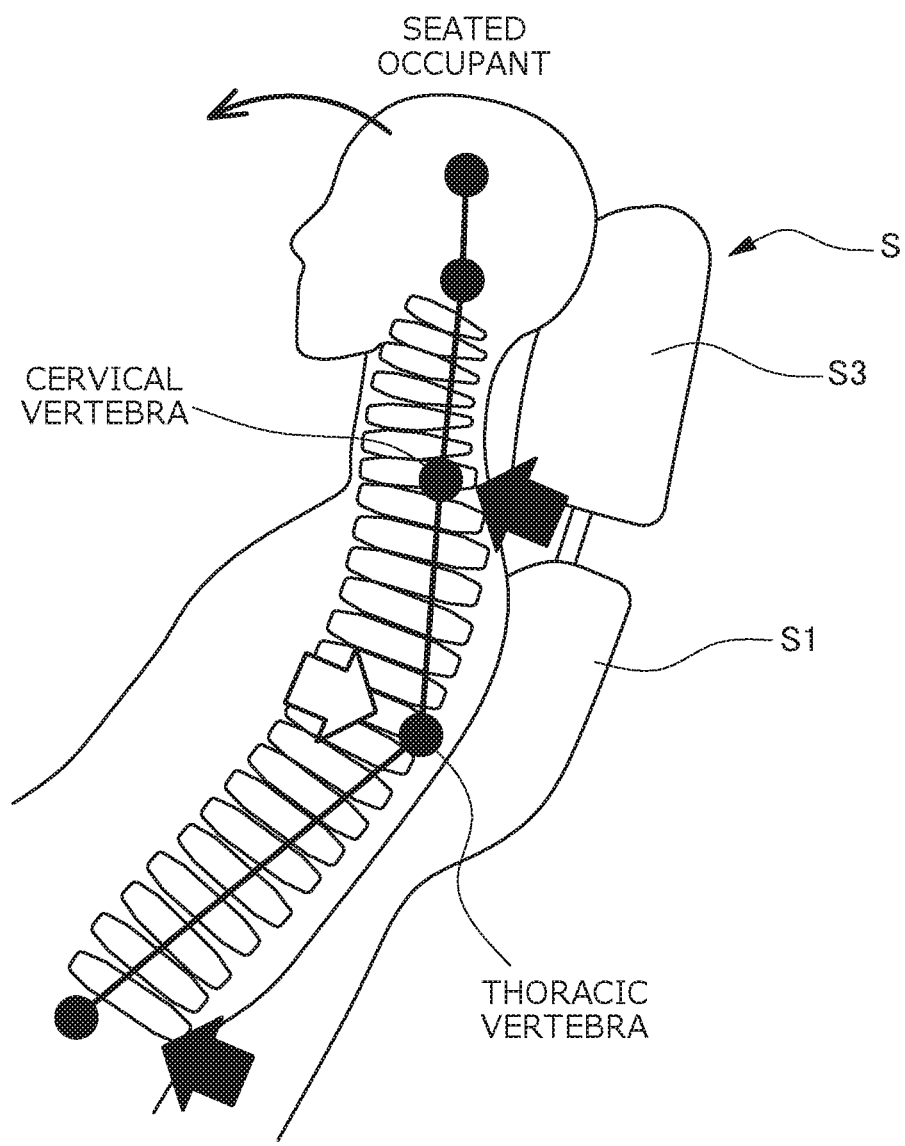
FIG. 9 is a drawing illustrating a state in a general sinking phenomenon.

Briefly, in the general vehicle seat S, as described above, the amount of sinking of the chest at the time of the sinking phenomenon is greater than that of another portion. As a result, as shown in FIG. 9, the seated occupant's posture turns to a so-called slouching posture and therefore the head of the seated occupant tilts remarkably forward.

For dealing with such a situation, a member for restraining the thoracic vertebra equivalent portion of the back of the seated occupant at the time of the vehicle rear-end collision is provided in an embodiment; therefore, the amount of sinking of the chest is reduced. Consequently, as shown in FIG. 6, the seated occupant can hold the upper body in an upstand position. In other words, the member (movement reduction member) for pressing the thoracic vertebra equivalent portion of the back of the seated occupant at the time of the vehicle rear-end collision absorbs an input (impact energy) to the seated occupant. As a result, the head of the seated occupant is inhibited from tilting forward and the load applied to the seated occupant can be reduced.

Furthermore, in an embodiment, the aforementioned connecting wire 21 is applied as the member for restraining the thoracic vertebra equivalent portion of the back of the seated occupant at the time of the vehicle rear-end collision. That is, the connecting wire 21 functions as the movement reduction member described above. Therefore, it is not necessary to prepare a different member for reducing the load applied to the seated occupant as well as the load applied to the seated occupant can be reduced by a relatively simple configuration. As a result, the number of components and the size of the seatback frame 1 are inhibited from increasing.

The configuration of the connecting wire 21 will be hereinafter described in more detail. As previously described, the connecting wire 21 according to an embodiment is bent at several times at its midway positions. The connecting wire 21 includes the horizontal portions 21a which extend in the width direction of the seat back S1 and the U-shaped portions 21b which are bent perpendicularly relative to the horizontal portions 21a and folded into substantially U-shapes. In particular, the above U-shaped portions 21b are formed at plural portions, specifically, at two portions to be positioned in a bilaterally symmetrical manner with respect to the center in the width direction of the seat back S1. In other words, in an embodiment, the connecting wire 21 is configured to have a bilaterally symmetrical shape.

In addition, as shown in FIG. 4, each of the U-shaped portions 21b is substantially at the same position as the position of the pillar supporting portion 19a in the width direction of the seat back S1. More precisely, each U-shaped portion 21b is arranged to be at least partially positioned outward from the headrest pillar 19 or the pillar supporting portion 19a in the width direction of the seat back S1. Specifically, a pair of bent portions 21d described below is provided in each U-shaped portion 21b, and one of the bent portions 21d, which is positioned outward from the other of the bent portions 21d in the width direction of the seat back S1 is positioned outward from the headrest pillar 19 or the pillar supporting portion 19a.

As shown in FIGS. 4 and 5, the U-shaped portion 21b is bent so that a lower end thereof extends forward. That is, the lower end of the U-shaped portion 21b of the connecting wire 21 corresponds to a forward extending portion which extends toward the front of the vehicle seat S. Thus, in an embodiment, the lower end of the U-shaped portion 21b is bent toward the front of the vehicle seat S, thereby forming a portion which corresponds to the forward extending portion of the connecting wire 21.

Here, the shape of the U-shaped portion 21b will be described in detail. Hanging down portions 21c formed continuously from the horizontal portions 21a to hang down (precisely, in a direction inclined slightly forward with respect to the vertical direction) are formed at right and left ends of the U-shaped portion 21b. A lower end of each of the hanging down portions 21c is bent forward to thereby form the bent portion 21d serving as a first extending portion. Further, in an embodiment, as shown in FIG. 5, the lower end of the hanging down portion 21c is bent in a state where the bent portion 21d is slightly inclined to extend downward toward the front.

Furthermore, a front portion 21e as a second extending portion formed continuously with front ends of the bent portions 21d to extend in the width direction of the seat back S1 is formed between the front ends of the bent portions 21d. That is, the bent portions 21d and the front portion 21e of the U-shaped portion 21b configure the foregoing forward extending portion.

In addition, the pad member 1a of the seat back S1 is arranged ahead of the connecting wire 21 including the U-shaped portions 21b. Therefore, at the time of the vehicle rear-end collision, the front portion 21e of the U-shaped portion 21b of the connecting wire 21 presses via the pad member 1a against the thoracic vertebra equivalent portion of the back of the seated occupant. In other words, the front portion 21e of the U-shaped portion 21b is arranged in the same position as the position of the thoracic vertebra equivalent portion of the back of the seated occupant in the height direction of the seat back S1. As described above, in an embodiment, a portion of the connecting wire 21, which is bent into a U-shape, presses the back of the seated occupant at the time of the vehicle rear-end collision; therefore, rigidity of such pressing portion is ensured. As a result, the thoracic vertebra equivalent portion of the back of the seated occupant can be appropriately restrained.

Further, in an embodiment, the width (the distance in the width direction of the seat back S1) of the front portion 21e of the U-shaped portion 21b is larger than the width of the headrest pillar 19 or the pillar supporting portion 19a. Thus, the front portion 21e which directly presses the back of the seated occupant is wide; thereby, the thoracic vertebra equivalent portion of the back of the seated occupant can be stably pressed.

Moreover, in an embodiment, the connecting wire 21 has a diameter greater than that of a wire of a pressure receiving member; thereby, the thoracic vertebra equivalent portion of the back of the seated occupant can be stably pressed by the U-shaped portion 21b. In addition, in the configuration where the pressure receiving member 20 formed by a resin plate is utilized, the wire of the pressure receiving member corresponds to the fixation wire 20a for hanging the pressure receiving member 20 down to the side frames 15. In the configuration where the pressure receiving member 40 formed by an S spring is utilized, the wire of the pressure receiving member corresponds to the S spring.

A position in the connecting wire 21 in which the U-shaped portion 21 is formed, in particular, positions in the connecting wire 21 in which the bent portions 21d and the front portion 21e of the U-shaped portion 21b are formed, and advantageous effects made by the positions will be hereinafter described. In an embodiment, as shown in FIG. 3 or FIG. 11, the position in the connecting wire 21 in which the U-shaped portion 21 is formed is located within an area where the pressure receiving member 20, 40 is provided in the width direction of the seat back S1. Thus, the U-shaped portion 21 is located within the width of the pressure receiving member 20, 40; thereby, a feeling of discomfort the seated occupant has when pressed by the U-shaped portion 21 can be reduced, compared to a configuration where the U-shaped portion 21 is located outside the pressure receiving member 20, 40.

Further, in an embodiment, as shown in FIG. 3, the position in the connecting wire 21 in which the U-shaped portion 21 is formed is closer to the pressure receiving member 20 in the up to down direction than the pillar supporting portion 19a. Therefore, a feeling of discomfort the seated occupant has when pressed by the U-shaped portion 21 can be further effectively reduced, but not limited thereto. As shown in FIG. 11, the position in the connecting wire 21 in which the U-shaped portion 21 is formed may be closer to the pillar supporting portion 19a in the up to down direction than the pressure receiving member 40. According to such configuration, the U-shaped portion 21b is located away from the pressure receiving member 40; therefore, the thoracic vertebra equivalent portion of the back of the seated occupant can be stably pressed while an influence of the pressure receiving member 40 is eliminated.

Furthermore, in an embodiment, as shown in FIG. 5, the position in the connecting wire 21 in which the front end of the U-shaped portion 21b, i.e., the front portion 21e is provided, is ahead of a rear end of the side frame 15. More specifically, the connecting wire 21 is arranged so that the front portion 21e of the U-shaped portion 21b is located at a rear side of a front end of the side frame 15 and in a front side of the rear end of the side frame 15. Therefore, the front portion 21e of the U-shaped portion 21b does not press the back of the seated occupant at normal times while pressing the thoracic vertebra equivalent portion of the back of the seated occupant at the time of a vehicle rear-end collision. That is, the front portion 21e of the U-shaped portion 21b presses the back of the seated occupant only at the time of a vehicle rear-end collision, but at other times the front portion 21e is inhibited from interfering with the seated occupant. As a result, even when a portion of the connecting wire 21 is bent forward, a seating feeling at the vehicle seat S can be secured and maintained.

Moreover, in an embodiment, as shown in FIG. 4, the two U-shaped portions 21b configured as described above are formed in the center of the connecting wire 21 in the width direction of the seat back S1. In other words, plural portions which press the thoracic vertebra equivalent portion of the back of the seated occupant at the time of a vehicle rear-end collision exist in the width direction of the seat back S1. Therefore, the plural portions can press the thoracic vertebra equivalent portion at the time of a vehicle rear-end collision and the amount of sinking of the chest of the seated occupant can be further effectively reduced. Further, the number of portions which press the thoracic vertebra equivalent portion of the back of the seated occupant at the time of a vehicle rear-end collision is not limited to two but may be three or more, or only one. Furthermore, in an embodiment, the connecting wire 21 is configured to have a bilaterally symmetrical shape, and the two U-shaped portions 21b are formed to be positioned in a bilaterally symmetrical manner with respect to the center in the width direction of the seat back S1. The U-shaped portions 21b are bilateral symmetrically arranged as just described; thereby, a feeling of discomfort the seated occupant has when seated on the vehicle seat S can be reduced.

Further, the connecting wire 21 is positioned below the headrest pillar 19 of the headrest S3 in the vehicle seat S. Furthermore, the U-shaped portion 21b of the connecting wire 21 is provided to overlap the arrangement position of the headrest pillar 19 in the width direction of the seat back S1. Here, there is a space below the headrest pillar 19 in the seatback frame 1, and such space is utilized in the present embodiment to provide the U-shaped portion 21b of the connecting wire 21. As a result, the seatback frame 1 according to an embodiment is sufficiently compactly formed.

In addition, in an embodiment, the position in the connecting wire 21 in which the U-shaped portion 21b is formed is below the headrest pillar 19 and ahead of the headrest pillar 19. Moreover, a portion of the U-shaped portion 21b is may be configured to be positioned outward from the headrest pillar 19 or the pillar supporting portion 19a in the width direction of the seat back S1. Specifically, as shown in FIG. 4, one of the pair of bent portions 21d, which is positioned outward from the other of the bent portions 21d in the width direction, and a portion of the front portion 21e, which adjoins the bent portion 21d positioned outward in the width direction are positioned outward from the headrest pillar 19 or the pillar supporting portion 19a in the width direction. Thus, in a case where a portion of the U-shaped portion 21b is positioned outward from the headrest pillar 19 or the pillar supporting portion 19a in the width direction, a portion of the connecting wire 21, which is further adjacent to its fixed end (the end welded to the upward extending portion 16A) presses the thoracic vertebra equivalent portion of the back of the seated occupant. Consequently, the thoracic vertebra equivalent portion can be further stably pressed by the U-shaped portion 21b of the connecting wire 21.

Further, in an embodiment, when seen from the end in the width direction, the connecting wire 21 is provided in a rear side of an area where the pressure receiving member 20 is positioned in the front to back direction. When an occupant sits on the seat, such positional relation enables the seated occupant to be first supported by the pressure receiving member 20 and be thereafter pressed by the U-shaped portion 21b of the connecting wire 21. As a result, the connecting wire 22 is further stably supported.

Furthermore, when seen from the end in the width direction, the U-shaped portion 21b of the connecting wire 21 may be provided in a rear side of an imaginary plane which passes through the center in the front to back direction of the upward extending portion 16A included in the upper frame 16 of the seatback frame 1 (see FIG. 10). When an occupant sits on the seat, such positional relation enables the seated occupant to be supported by the upper frame 16 and be thereafter pressed by the U-shaped portion 21b. Therefore, the connecting wire 21 is further stably supported.

Moreover, in an embodiment, the connecting wire 21 is arranged inward from the upward extending portion 16A of the upper frame 16 in the width direction and is attached to the upward extending portion 16A. That is, the connecting wire 21 is arranged inward in the width direction of the seatback frame and is therefore arranged further compactly.

In addition, in an embodiment as just described, the end of the connecting wire 21 is welded to the upward extending portion 16A of the upper frame 16, specifically, to the overlapped portion of the upward extending portion 16A with the side frame 15. As a result, the attaching rigidity of the connecting wire 21 is relatively high; thereby, at the time of a vehicle rear-end collision, the thoracic vertebra equivalent portion of the back of the seated occupant can be appropriately maintained in a pressed state. Further, the position in the connecting wire 21 in which the lower end (i.e., the bent portions 21d and the front portion 21e) of the U-shaped portion 21b is formed is ahead of an attachment position of the end of the connecting wire 21 to the upward extending portion 16A of the upper frame 16.

As described above, the U-shaped portion 21b of the connecting wire 21 presses the thoracic vertebra equivalent portion of the back of the seated occupant at the time of a vehicle rear-end collision, thereby reducing the rearward movement (the amount of sinking) of the chest of the seated occupant at the time of the sinking phenomenon. Meanwhile, the member that presses the thoracic vertebra equivalent portion of the back of the seated occupant at the time of a vehicle rear-end collision, and its shape are not specifically limited. Alternatively, an existing component may be applied to the movement reduction member. Also, a separate component dedicated as the movement reduction member may be adopted. In addition, in an embodiment where the shape of the connecting wire 21 can be modified correspondingly, it is not necessary to adopt an additional component. Therefore, an increase of the cost or weight can be minimized.

Figure 7:
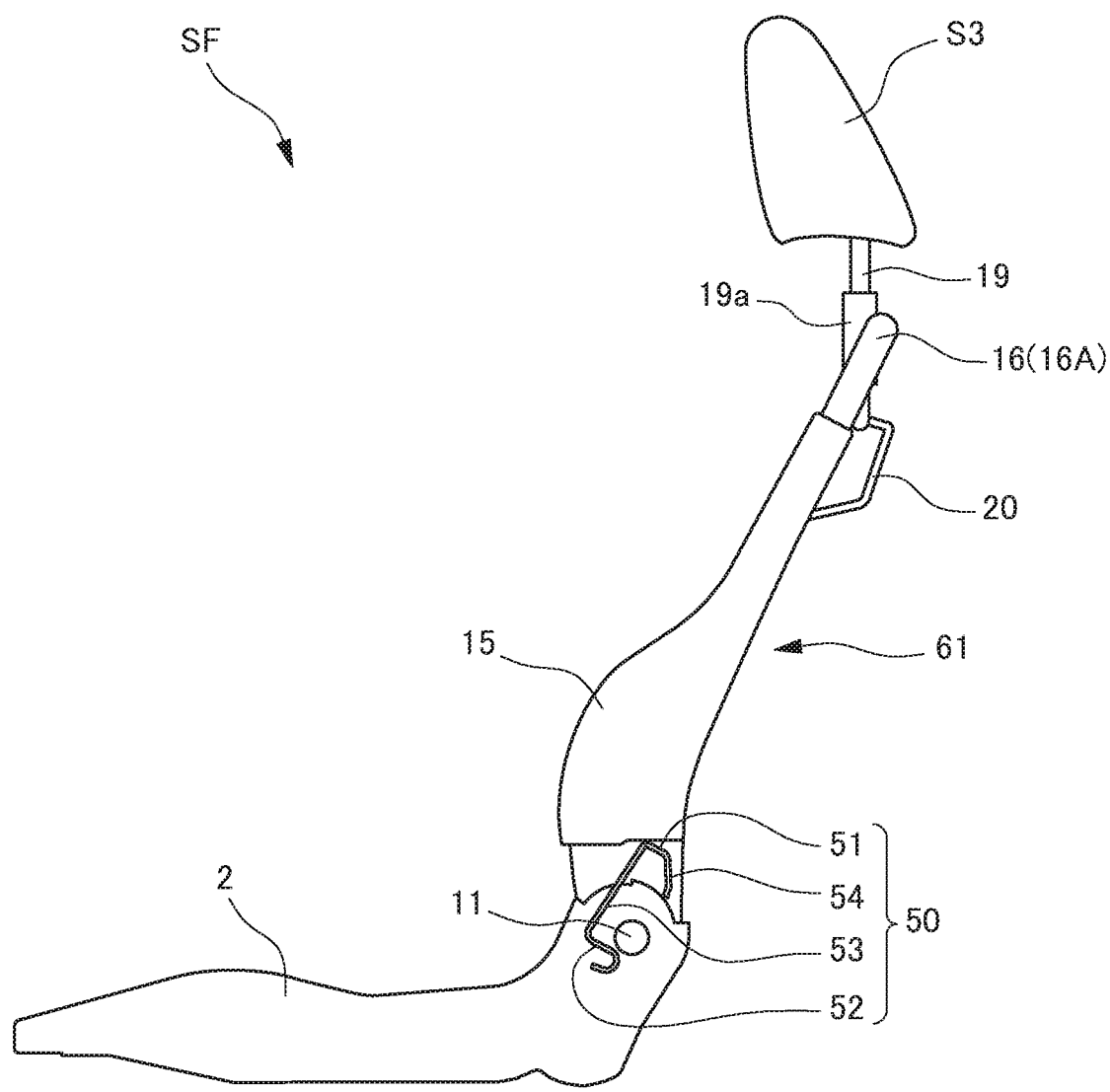
FIG. 7 is a side view of the seatback frame according to a modified example.

Further, a lower-back movement restriction member 50 shown in FIG. 7 is provided in a seatback frame 61; thereby, an advantageous effect to reduce the load applied to the seated occupant is further effectively exerted. FIG. 7 is a side view of the seatback frame 61 according to a modified example. The configuration of the seatback frame 61 according to the modified example will be hereinafter described.

The seatback frame 61 according to the modified example is configured similarly to the seatback frame 1 that is already described and shown in FIGS. 2 and 3, except that the seatback frame 61 is provided with the low-back movement restriction member 50. The low-back movement restriction member 50 serves to restrain the lower back of the seated occupant and restrict a rearward movement of the lower back when the seated occupant is moved toward the rear side of the vehicle seat S by a vehicle rear-end collision.

Figure 8:
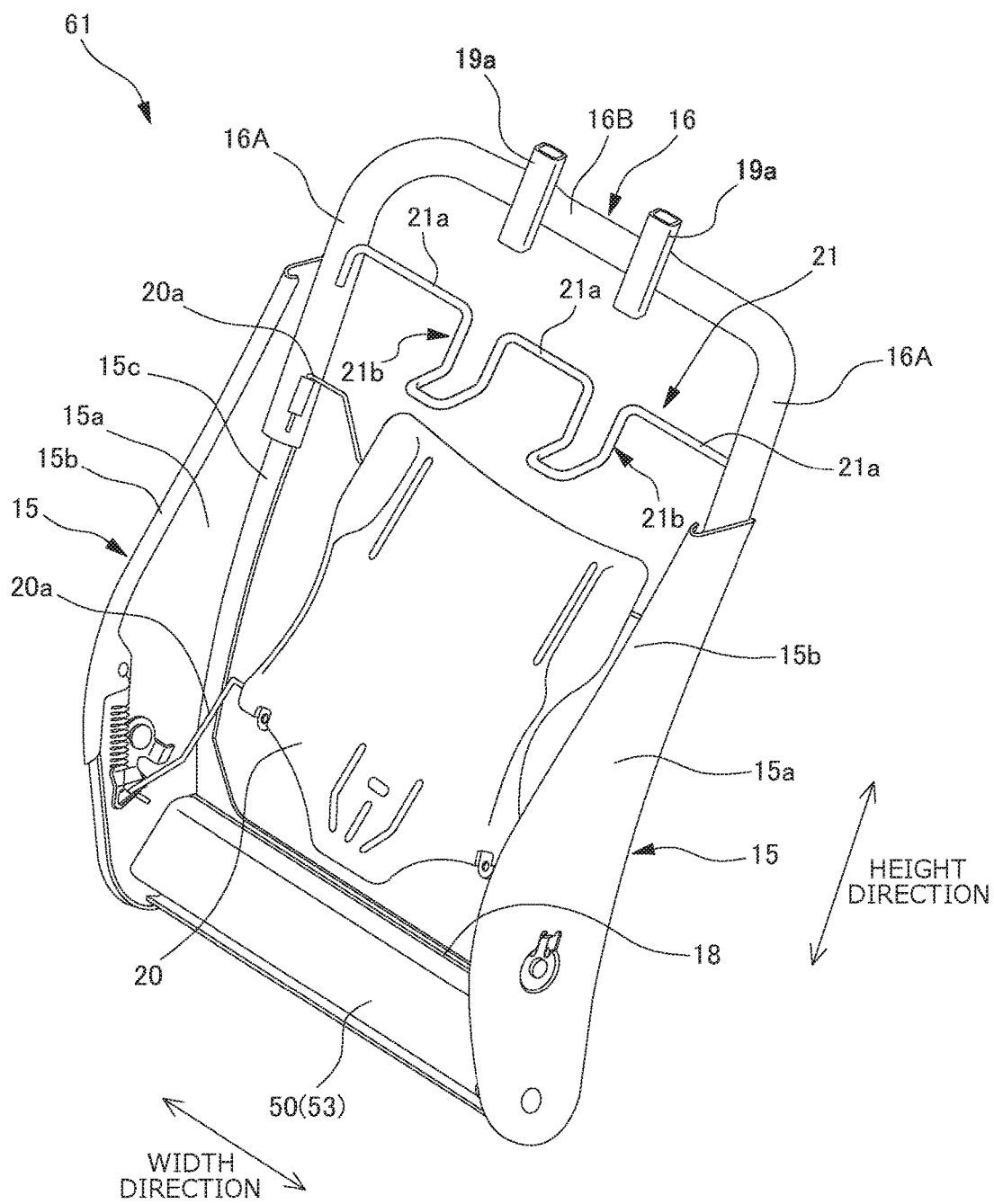
FIG. 8 is a perspective view of the seatback frame according to the modified example.

The above-mentioned low-back movement restriction member 50 is arranged in the lower frame bridging portion 18 in the seatback frame 1 according to the modified example. More specifically, a metallic plate body having a predetermined thickness is bent, thereby forming the low-back movement restriction member 50. The strength and hardness are designed to support a load at the time of the rear-end collision. Further, as shown in FIG. 8, the low-back movement restriction member 50 is attached to a side surface on the front of the lower frame bridging portion 18. FIG. 8 is a perspective view of the seatback frame 61 according to the modified example.

In addition, the low-back movement restriction member 50 is formed in a substantially square tubular shape. A side surface of the low-back movement restriction member 50 is partially cut out. The low-back movement restriction member 50 will be described in details. As shown in FIG. 7, the low-back movement restriction member 50 includes an upper wall 51, a lower wall 52, a front wall 53, and a rear wall 54. The upper wall 51 is a substantially rectangular planar portion which is arranged substantially horizontally to a vehicle floor. The rear wall 54 is provided in a rear end of the upper wall 51 to hang down from the rear end. Further, the front wall 53 is provided in a front end of the upper wall 51 to hang down from the front end. Furthermore, the lower wall 52 is provided in a lower end of the front wall 53 to be in substantially parallel with the upper wall 51 and is extended to be bent rearward. Moreover, a free end of the lower wall 52 is curved forward and formed into a hook shape.

The rear wall 54 of the low-back movement restriction member 50 configured as described above is welded to the side surface on the front of the lower frame bridging portion 18, and the low-back movement restriction member 50 is provided to project toward the front of the seatback frame 1, i.e., in a direction in which an occupant seated on the seat faces. As shown in FIG. 7, the reclining shaft 11 is provided to penetrate through the low-back movement restriction member 50 and is positioned so as not to make contact with the low-back movement restriction member 50. Therefore, the low-back movement restriction member 50 and the reclining device can be restricted from interfering with each other when the reclining device operates to rotate the reclining shaft 11.

Further, the low-back movement restriction member 50 is provided; thereby, the load applied to the seated occupant can be further effectively reduced. Briefly, the low back of the seated occupant is restricted from moving rearward by the low-back movement restriction member 50 at the time of a vehicle rear-end collision, and in the meantime, the torso and the head of the seated occupant pivot rearward about the low back. At this time, the thoracic vertebra equivalent portion of the back of the seated occupant is restrained and the chest is therefore restricted from moving rearward. Therefore, the head of the seated occupant moves rearward. Consequently, the head of the seated occupant can be effectively supported by the headrest S3; thus, the advantageous effect to reduce the load applied to the seated occupant can be remarkably exerted.

Figure 12:
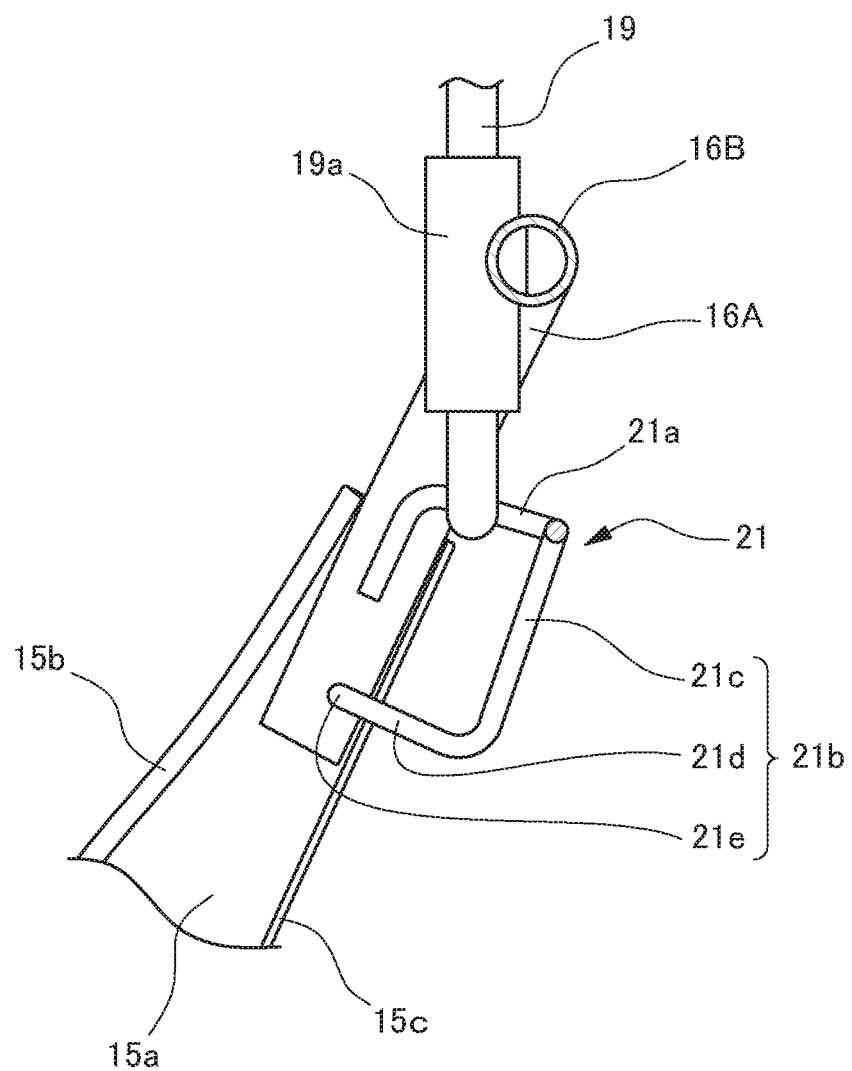
FIG. 12 is a diagram of the connecting wire according to a modified example.

Furthermore, a case where the shape of the connecting wire 21 is modified as shown in FIG. 12 may be given as a modified example of the seatback frame. FIG. 12 illustrates the connecting wire 21 according to the modified example and corresponds to FIG. 5. According to an embodiment illustrated in FIG. 5, the hanging down portion 21c and the bent portion 21d of the U-shaped portion 21b that is formed at the connecting wire 21 intersect with each other at an obtuse angle. In the modified example shown in FIG. 12, the hanging down portion 21c and the bent portion 21d intersect with each other substantially at right angle. Such configuration is more advantageous in stably maintaining the thoracic vertebra equivalent portion of the back of the seated occupant in a restrained state, than the configuration shown in FIG. 5. The configuration shown in FIG. 5 is more advantageous in reducing a feeling of discomfort given to the seated occupant (in specific, a feeling of discomfort given when the thoracic vertebra equivalent portion is restrained), than the configuration shown in FIG. 12. Moreover, in FIG. 12, the bent portion 21d extends in a direction orthogonal to the hanging down portion 21c but may extend in the front to back direction of the vehicle seat S (in specific, in a horizontal direction when the vehicle runs on a horizontal surface). With such configuration, an effect similar to the effect of the configuration shown in FIG. 12, an advantageous effect to further stably maintain the thoracic vertebra equivalent portion of the back of the seated occupant in a restrained state, is exerted.

REFERENCE SIGNS LIST

1: seatback frame
2: seat cushion frame
1a, 2a, 3a: pad member
1b, 2b, 3b: surface material
11: reclining shaft
15: side frame
15a: side plate
15b: front rim portion
15c: rear rim portion
16: upper frame
16A: upward extending portion
16B: pillar attachment portion
18: lower frame bridging portion
19: headrest pillar
19a: pillar supporting portion
20: pressure receiving member
20a: fixation wire
21: connecting wire
21a: horizontal portion
21b: U-shaped portion
21c: hanging down portion
21d: bent portion (first extending portion)
21e: front portion (second extending portion)
40: pressure receiving member
50: lower-back movement restriction member
51: upper wall
52: lower wall
53: front wall
54: rear wall
61: seatback frame according to a modified example
S: vehicle seat
S1: seat back
S2: seat cushion
S3: headrest
SF: seat frame

The invention claimed is:

1. A seatback frame forming a frame of a seat back which supports a back of a seated occupant on a vehicle seat, the seatback frame comprising:

a movement reduction member configured to, when the seated occupant is moved rearwardly in the vehicle seat by a vehicle collision, restrain the back of the seated occupant and reduce a rearward movement of the back of the seated occupant, wherein the movement reduction member is a wire-shaped member comprising a forward extending portion which extends to a front side of the vehicle seat;

wherein the wire-shaped member is a connecting wire connecting both ends of the seat back in a width direction thereof, wherein a predetermined portion of the connecting wire is bent toward the front side of the vehicle seat to form the forward extending portion, wherein the forward extending portion comprises a plurality of forward extending portions formed in the center of the connecting wire in the width direction, and wherein each of the plurality of forward extending portions comprises a first extending portion extending toward the front side of the vehicle seat and a second extending portion continuously formed with a front end of the first extending portion to extend in the width direction.

2. The seatback frame according to claim 1, wherein the connecting wire is positioned below a headrest pillar in the vehicle seat, the headrest pillar being provided to attach a headrest to the seat back, and wherein the second extending portion is positioned to overlap a position in which the headrest pillar is arranged in the width direction.

3. The seatback frame according to claim 1, wherein a pair of lateral frames is arranged in the both ends of the seat back in the width direction, and wherein the second extending portion is positioned in a rear side of front ends of the lateral frames and in a front side of rear ends of the lateral frames.

4. The seatback frame according to claim 1, further comprising a low-back movement restriction member configured to, when the seated occupant is moved toward the rear side of the vehicle seat by the vehicle collision, restrain a low back of the seated occupant to inhibit a rearward movement of the low back.

5. The seatback frame according to claim 1, comprising a pressure receiving member arranged in an inclined state with respect to an up to down direction to support an upper body of the seated occupant so that the upper body moves rearward, wherein when seen from an end of the seat back in a width direction thereof, the movement reduction member is provided in a rear side of an area where the pressure receiving member is positioned in a front to back direction.

6. The seatback frame according to claim 1, comprising an upper frame forming an upper end of the seatback frame to comprise a portion extending in a height direction of the seat back, wherein when seen from an end of the seat back in a width direction thereof, the second extending portion is provided in a rear side of an imaginary plane which passes through the center in a front to back direction of the portion of the upper frame extending in the height direction.

7. The seatback frame according to claim 1, further comprising an upper frame forming an upper end of the seatback frame to comprise a portion extending in a height direction of the seat back, wherein the portion of the upper frame extending in the height direction is positioned in each of both ends of the seat back in a width direction thereof, and wherein the movement reduction member is arranged in an inner side in the width direction from the portion of the upper frame extending in the height direction and is attached to the portion of the upper frame extending in the height direction.

8. The seatback frame according to claim 1, wherein the connecting wire is positioned below a headrest pillar in the vehicle seat, the headrest pillar being provided to attach a headrest to the seat back, and wherein a position in the connecting wire in which the forward extending portion is formed is below the headrest pillar.

9. The seatback frame according to claim 8, wherein the position in the connecting wire in which the forward extending portion is formed is ahead of the headrest pillar.

10. The seatback frame according to claim 1, further comprising an upper frame forming an upper end of the seatback frame to comprise a portion extending in a height direction of the seat back, wherein each of both ends of the connecting wire in the width direction is attached to the portion of the upper frame extending in the height direction, and wherein a position in the connecting wire in which the forward extending portion is formed is ahead of an attachment position of the end of the connecting wire to the portion of the upper frame extending in the height direction.

11. The seatback frame according to claim 1, wherein a pair of lateral frames is arranged in the both ends of the seat back in the width direction, and wherein a position in the connecting wire in which the second extending portion is provided is ahead of rear ends of the lateral frames.

12. A seatback frame forming a frame of a seat back which supports a back of a seated occupant on a vehicle seat, the seatback frame comprising:

a movement reduction member configured to, when the seated occupant is moved rearwardly in the vehicle seat by a vehicle collision, restrain the back of the seated occupant and reduce a rearward movement of the back of the seated occupant, wherein the movement reduction member is a wire-shaped member comprising a forward extending portion which extends to a front side of the vehicle seat, wherein the forward extending portion comprises a first extending portion extending toward the front side of the vehicle seat and a second extending portion continuously formed with a front end of the first extending portion to extend in the width direction, wherein the second extending portion is positioned ahead of a headrest pillar in the vehicle seat, the headrest pillar being provided to attach a headrest to the seat back, and wherein a rear end of the movement reduction member is positioned in a rear side of the headrest pillar in the vehicle seat.

13. The seatback frame according to claim 12, wherein the rear end of the movement reduction member is positioned above the second extending portion.

14. The seatback frame according to claim 12, wherein the wire-shaped member is a connecting wire connecting both ends of the seat back in a width direction thereof, wherein both ends of the connecting wire in the width direction are attached to an upper end of the seatback frame, and wherein the rear end of the movement reduction member is positioned in a rear side of an attachment position of the both ends of the connecting wire to the upper end of the seatback frame.

15. A seatback frame forming a frame of a seat back which supports a back of a seated occupant on a vehicle seat, the seatback frame comprising:

a movement reduction member configured to, when the seated occupant is moved rearwardly in the vehicle seat by a vehicle collision, restrain the back of the seated occupant and reduce a rearward movement of the back of the seated occupant, and a pillar supporting portion supporting a headrest pillar which is provided to attach a headrest to the seat back;

wherein the movement reduction member is a wire-shaped member comprising a forward extending portion which extends to a front side of the vehicle seat, wherein the forward extending portion comprises a first extending portion extending toward the front side of the vehicle seat and a second extending portion continuously formed with a front end of the first extending portion to extend in the width direction, and wherein the pillar supporting portion is positioned between both ends of the second extending portion in the width direction.

16. The seatback frame according to claim 15, wherein the pillar supporting portion comprises a plurality of pillar supporting portions.

* * * * *